United States Patent
Oohashi et al.

(10) Patent No.: US 8,146,693 B2
(45) Date of Patent: Apr. 3, 2012

(54) MOTORCYCLE AND INTAKE DEVICE THEREOF

(75) Inventors: Satoshi Oohashi, Iwata (JP); Shidehiko Miyashiro, Iwata (JP); Hiroshi Shimomura, Iwata (JP); Satoshi Terumichi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 350 days.

(21) Appl. No.: 12/391,851

(22) Filed: Feb. 24, 2009

(65) Prior Publication Data

US 2009/0218152 A1 Sep. 3, 2009

(30) Foreign Application Priority Data

Feb. 29, 2008 (JP) ................. 2008-049680

(51) Int. Cl.
*B60K 13/02* (2006.01)

(52) U.S. Cl. ..................................................... 180/68.3

(58) Field of Classification Search .............. 180/68.1, 180/68.2, 68.3, 68.4, 218, 219, 225, 229
See application file for complete search history.

(56) References Cited

U.S. PATENT DOCUMENTS

| | | | | | |
|---|---|---|---|---|---|
| 4,452,330 | A | * | 6/1984 | Matsuyama | 180/219 |
| 4,454,719 | A | * | 6/1984 | Shinozaki et al. | 60/605.1 |
| 4,457,524 | A | * | 7/1984 | Yoshiwara | 280/835 |
| 4,509,613 | A | * | 4/1985 | Yamaguchi | 180/219 |
| 4,629,201 | A | * | 12/1986 | Tsukiji | 280/835 |
| 4,694,924 | A | * | 9/1987 | Asakura et al. | 180/68.3 |
| 4,722,412 | A | * | 2/1988 | Takemura et al. | 180/229 |
| 4,778,029 | A | * | 10/1988 | Thornburgh | 181/229 |
| 4,793,293 | A | * | 12/1988 | Minami | 123/41.7 |
| 4,799,569 | A | * | 1/1989 | Hattori et al. | 180/219 |
| 4,881,614 | A | * | 11/1989 | Hoshi et al. | 180/225 |
| 5,024,287 | A | * | 6/1991 | Okui et al. | 180/297 |
| RE34,072 | E | * | 9/1992 | Asakura et al. | 180/68.3 |
| 5,145,023 | A | * | 9/1992 | Tsurumi et al. | 180/68.1 |
| 5,172,788 | A | * | 12/1992 | Fujii et al. | 180/219 |
| 5,301,767 | A | * | 4/1994 | Shiohara | 180/219 |
| 5,323,869 | A | * | 6/1994 | Kurayoshi et al. | 180/219 |
| 5,908,079 | A | * | 6/1999 | Amino | 180/219 |
| 6,251,151 | B1 | * | 6/2001 | Kobayashi et al. | 55/309 |
| 6,409,783 | B1 | * | 6/2002 | Miyajima et al. | 55/385.3 |
| 6,422,201 | B1 | * | 7/2002 | Yamada et al. | 123/336 |
| 6,776,250 | B2 | * | 8/2004 | Kuji et al. | 180/68.3 |
| 7,073,617 | B2 | * | 7/2006 | Miyashiro et al. | 180/219 |
| 7,264,072 | B2 | * | 9/2007 | Yoshikawa et al. | 180/68.3 |
| 7,302,934 | B2 | * | 12/2007 | Ishii et al. | 123/445 |

(Continued)

FOREIGN PATENT DOCUMENTS

JP 02293287 A * 12/1990

(Continued)

*Primary Examiner* — J. Allen Shriver, II
*Assistant Examiner* — Brodie Follman
(74) *Attorney, Agent, or Firm* — Keating & Bennett, LLP (57) ABSTRACT

According to some embodiments, a motorcycle includes a vehicle body frame 20, an engine 3 mounted on the vehicle body frame, a fuel tank 4 disposed above the engine, a radiator 5 disposed in front of the engine, and an intake device 6 connected to the engine. The intake device 6 has an intake opening 30*d*, and an intake passage 31 which connects the intake opening in fluid communication with a front portion of the engine. The intake passage 31 is disposed between the fuel tank 4 and the radiator 5 as viewed from a side of the motorcycle.

23 Claims, 7 Drawing Sheets

U.S. PATENT DOCUMENTS

| | | | | |
|---|---|---|---|---|
| 7,331,322 B2* | 2/2008 | Seki et al. | | 123/184.21 |
| 7,357,205 B2* | 4/2008 | Nishizawa | | 180/68.3 |
| 7,380,624 B2* | 6/2008 | Momosaki | | 180/68.3 |
| 7,418,937 B2* | 9/2008 | Yokoi | | 123/184.53 |
| 7,441,619 B2* | 10/2008 | Hatakeyama | | 180/68.3 |
| 7,527,115 B2* | 5/2009 | Tsuya | | 180/68.2 |
| 7,556,115 B2* | 7/2009 | Iwanaga | | 180/229 |
| 7,571,714 B2* | 8/2009 | Miyashiro | | 123/470 |
| 7,644,703 B2* | 1/2010 | Fujita | | 123/509 |
| 7,686,116 B2* | 3/2010 | Oohashi et al. | | 180/219 |
| 7,766,119 B2* | 8/2010 | Yokoi et al. | | 180/311 |
| 2004/0060545 A1* | 4/2004 | Kurayoshi et al. | | 123/472 |
| 2004/0206566 A1* | 10/2004 | Katsura | | 180/219 |
| 2005/0051375 A1* | 3/2005 | Momosaki | | 180/219 |
| 2005/0263334 A1* | 12/2005 | Okabe et al. | | 180/219 |
| 2006/0006016 A1* | 1/2006 | Nishizawa | | 180/219 |
| 2006/0254844 A1* | 11/2006 | Nakashima et al. | | 180/229 |
| 2007/0089923 A1* | 4/2007 | Oohashi et al. | | 180/229 |
| 2007/0144802 A1* | 6/2007 | Tsuya | | 180/68.2 |
| 2007/0193804 A1* | 8/2007 | Yokoi | | 180/219 |
| 2008/0006463 A1* | 1/2008 | Oohashi | | 180/219 |
| 2008/0011534 A1* | 1/2008 | Miyashiro | | 180/219 |
| 2008/0110687 A1* | 5/2008 | Miyashiro et al. | | 180/296 |
| 2008/0121453 A1* | 5/2008 | Koike | | 180/219 |
| 2008/0184954 A1* | 8/2008 | Yokoi et al. | | 123/184.53 |
| 2008/0184961 A1* | 8/2008 | Miyashiro | | 123/445 |
| 2008/0230037 A1* | 9/2008 | Fujita | | 123/509 |
| 2009/0090090 A1* | 4/2009 | Nishizawa et al. | | 55/290 |
| 2009/0090576 A1* | 4/2009 | Nishizawa et al. | | 180/219 |
| 2009/0166121 A1* | 7/2009 | Hiramatsu et al. | | 180/291 |
| 2009/0322069 A1* | 12/2009 | Koike | | 280/835 |

FOREIGN PATENT DOCUMENTS

| | | |
|---|---|---|
| JP | 2007-166989 | 6/1995 |
| JP | 3430596 | 7/2003 |

* cited by examiner

MOTORCYCLE AND INTAKE DEVICE THEREOF

This application claims priority under 35 U.S.C. §119 to Japanese Patent Applications No. 2008-049680 filed on Feb. 29, 2008, the entire disclosure of which is incorporated herein by reference in its entirety.

BACKGROUND

1. Field of the Invention

The preferred embodiments of the present invention relate, inter alia, to a motorcycle equipped with an engine mounted on a vehicle body frame, a fuel tank disposed above the engine, a radiator disposed in front of the engine, and an intake device connected to the engine, and also to an intake device of a motorcycle.

2. Description of the Related Art

The following description sets forth the inventor's knowledge of related art and problems therein and should not be construed as an admission of knowledge in the prior art.

As an intake device for a motorcycle, Japanese Patent No. 3,430,596 proposes the structure in which an intake passage is disposed between an engine and a fuel tank so as to extend in the fore-and-aft direction of the motorcycle, a suction port is formed at the front end of the intake passage, an air cleaner is interposed between the engine and the fuel tank at the intermediate portion of the intake passage, and a chamber is connected to the rear end of the intake passage.

In the aforementioned conventional intake device, as mentioned above, the intake passage is disposed between the engine and the fuel tank so as to extend in the fore-and-aft direction of the motorcycle. Therefore, the fuel tank is required to be disposed at a higher position in order to secure the necessary capacity of the fuel tank, which can result in an increased height of the seat.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a motorcycle capable of securing a necessary capacity of a fuel tank without increasing the height of the disposing position of the fuel tank.

Among other potential advantages, some embodiments can provide an intake device for a motorcycle capable of securing a necessary capacity of a fuel tank without increasing the height of the disposing position of the fuel tank.

According to a first aspect of the present invention, some embodiments can provide a motorcycle including a vehicle body frame, an engine mounted on the vehicle body frame, a fuel tank disposed above the engine, a radiator disposed in front of the engine, and an intake device connected to the engine, wherein the intake device has an intake opening, and an intake passage connects the intake opening to be in fluid communication with a front portion of the engine, and wherein the intake passage is disposed between the fuel tank and the radiator as viewed from a side of the motorcycle.

According to the aforementioned motorcycle, the intake passage is disposed between the fuel tank disposed above the engine and the radiator disposed in front of the engine, and therefore an intake passage can be disposed in a space between the fuel tank and the radiator by utilizing a space that would otherwise likely become a dead space. Accordingly, a front intake engine configuration can be realized. In this case, the fuel tank can be disposed at a lower position while securing the necessary capacity, and, furthermore, the seat height can be lowered. As a result, the user's getting on-and-off performance and foot landing performance can be enhanced.

In the aforementioned motorcycle, it is preferable that the motorcycle further includes a seat and that a front portion of the seat is disposed above the fuel tank.

It is preferable that the intake opening includes an air cleaner, and the air cleaner is disposed so that at least a part thereof is located between the fuel tank and the radiator as viewed from a side of the motorcycle.

It is preferable that the intake device further comprises an air introduction passage connected to the air cleaner and extending toward a front side of the motorcycle.

It is preferable that the air cleaner has an upper case disposed on an upper side, a lower case disposed on a lower side, and an element interposed between the upper case and the lower case, and the air introduction passage is connected to the upper case, and the intake passage is connected to the lower case.

The air introduction passage preferably has a suction port located further forward than the radiator.

The suction port is preferably disposed at a vehicle widthwise inner side of the air introduction passage.

The air introduction passage is preferably disposed so as to pass around a vehicle widthwise outer side the radiator.

The intake passage preferably extends in up-and-down directions.

In the aforementioned motorcycle, it is preferable that the vehicle body frame has a head pipe located in front of the fuel tank, the intake opening includes an air cleaner, and the air cleaner is disposed so that at least a part thereof is located between the fuel tank and the head pipe as viewed from a side of the motorcycle.

It is preferable that the vehicle body frame has right and left main frames extending rearward of a vehicle from the head pipe, the air cleaner has an upper case disposed on an upper side, a lower case disposed on a lower side, and an element interposed between the upper case and the lower case, and the upper case bulges out in the vehicle width direction so as to cover the right and left main frames from above.

It is preferable that the lower case is located between the right and left main frames and extends further downward than a lower edge of the main frame.

It is preferable that the radiator includes a first radiator and a second radiator disposed on one vehicle widthwise side and the other vehicle widthwise side, respectively, and a part of the air cleaner is located between the first and second radiators as viewed from a front side of the motorcycle and disposed so as to overlap with the radiators as viewed from a vehicle widthwise side of the motorcycle.

It is preferable that the intake passage is disposed so as to be located between the first and second radiators as viewed from the front side of the motorcycle.

It is preferable that a throttle body is connected to the intake passage, and the throttle body includes a fuel injection valve for injecting and supplying fuel into an intake port of the engine.

It is preferable that a throttle body is connected to the intake passage, the throttle body includes a fuel injection valve for injecting and supplying fuel into an intake port of the engine, and the fuel injection valve is located between the intake passage and a radiator as viewed from a vehicle widthwise side of the motorcycle.

According to a second aspect of the present invention, some embodiments can provide an intake device configured to be mounted on a motorcycle, the motorcycle comprising a vehicle body frame, an engine mounted on the vehicle body frame, a fuel tank disposed above the engine, and a radiator disposed in front of the engine, the intake device being configured to be connected to the engine. The intake device comprises an intake opening, and an intake passage connects the intake opening to be in fluid communication with a front portion of the engine. The intake passage is configured to be disposed between the fuel tank and the radiator as viewed from a side of the motorcycle.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of this invention will be described with reference to the attached drawings.

FIGS. 1 to 7 are views for explaining a motorcycle according to one embodiment of the present invention. Note that, "front," "back," "left," and "right" in the description of this embodiment mean "front," "back," "left," and "right" directions as viewed from a rider seated on a seat unless otherwise specified.

In the drawings, a reference numeral "1" denotes an off-road type motorcycle for use in, for example, motocross races.

Figure 1:
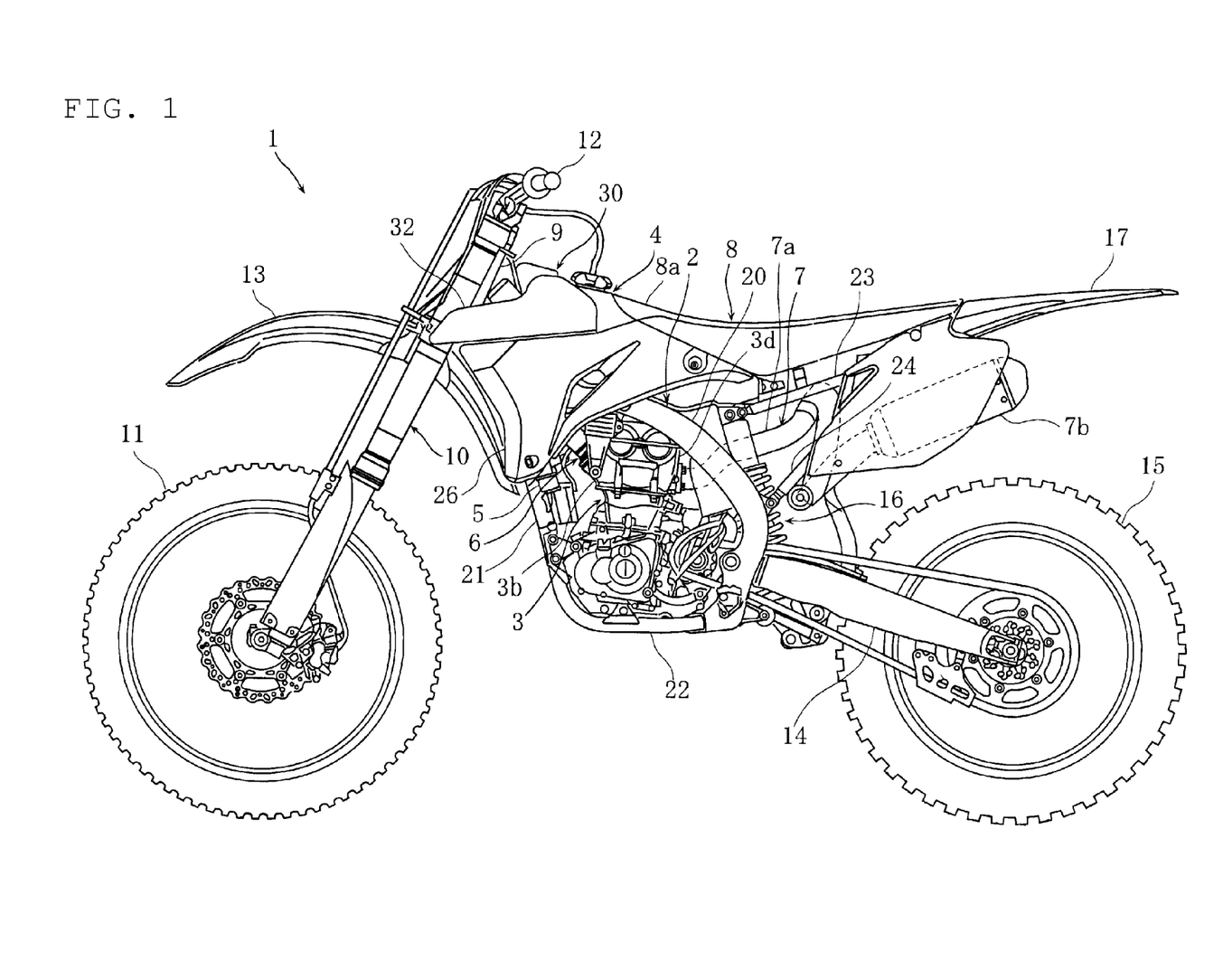
FIG. 1 is a side elevation view of a motorcycle according to one embodiment of the present invention.

The motorcycle 1 is provided with a cradle type vehicle body frame 2, a water-cooled four-cycle single cylinder engine 3 mounted on the vehicle body frame 2, a fuel tank 4 disposed above the engine 3, first and second radiators 5 and 5 disposed at the right and left front sides of the engine 3, and an intake device 6 connected to the engine 3.

The motorcycle 1 is also provided with an exhaust device 7 connected to the engine 3, and a straddle-type seat 8 mounted on the vehicle body frame 2 at the rear side of the fuel tank 4. The front portion 8a of the seat 8 is disposed so as to cover the rear portion of the upper surface of the fuel tank 4.

The vehicle body frame 2 has a head pipe 9 located in front of the fuel tank 4. The head pipe 9 supports a front fork 10 in such a manner as to be steered to the left and right.

A front wheel 11 is rotatably supported at the lower end portion of the front fork 10, and a steering handle 12 is attached to the upper end portion of the front fork 10. A front fender 13 covering the upper portion of the front wheel 11 is attached to the front fork 10.

To the vehicle body frame 2, a rear arm 14 is supported in an up-and-down swingable manner. At the rear end portion of the rear arm 14, a rear wheel 15 is rotatably supported. Between the rear arm 14 and the vehicle body frame 2, a rear cushion 16 is interposed. To the vehicle body frame 2, a rear fender 17 covering the upper portion of the rear wheel 15 is attached. The rear fender 17 extends rearward so as to form a substantially continuous surface with the seat 8.

The vehicle body frame 2 has the head pipe 9, right and left main frames 20 and 20 extending rearward from the head pipe 9, one upper down tube 21 substantially linearly extending downward from the head pipe 9, and right and left lower down tubes 22 and 22 each branched from the lower end portion of the upper down tube 21 to the right or left outer side and extended substantially horizontally rearward.

Each of the right and left main frames 20 extends obliquely rearward and downward from the head pipe 9 while curving toward the vehicle widthward outside. The rear end portions of the right and left lower down tubes 22 are connected to the lower end portions of the right and left main frames 20.

The vehicle body frame 2 has right and left seat rails 23 and 23 extending diagonally upward from rear boss portions 20a of the right and left main frames 20 and right and left seat stays 24 and 24 connected to the right and left seat rails 23 and the right and left main frames 20.

The engine 3 is mounted in a space surrounded by the right and left main frames 20, the upper down tube 21, and the right and left lower down tubes 22 with the cylinder axis thereof directed substantially vertically.

At the widthwise outer sides of the right and left main frames 20, right and left side covers 26 and 26 are disposed. The right and left side covers 26 cover the outer sides of the fuel tank 4 and radiators 5.

The fuel tank 4 is mounted on the upper surfaces of the front end portions of the right and left main frames 20 and extends obliquely rearward and downward substantially along the main frames 20. A fuel cap 4a for opening and closing a filler opening is provided at the upper wall front end portion of the fuel tank 4.

Figure 3:
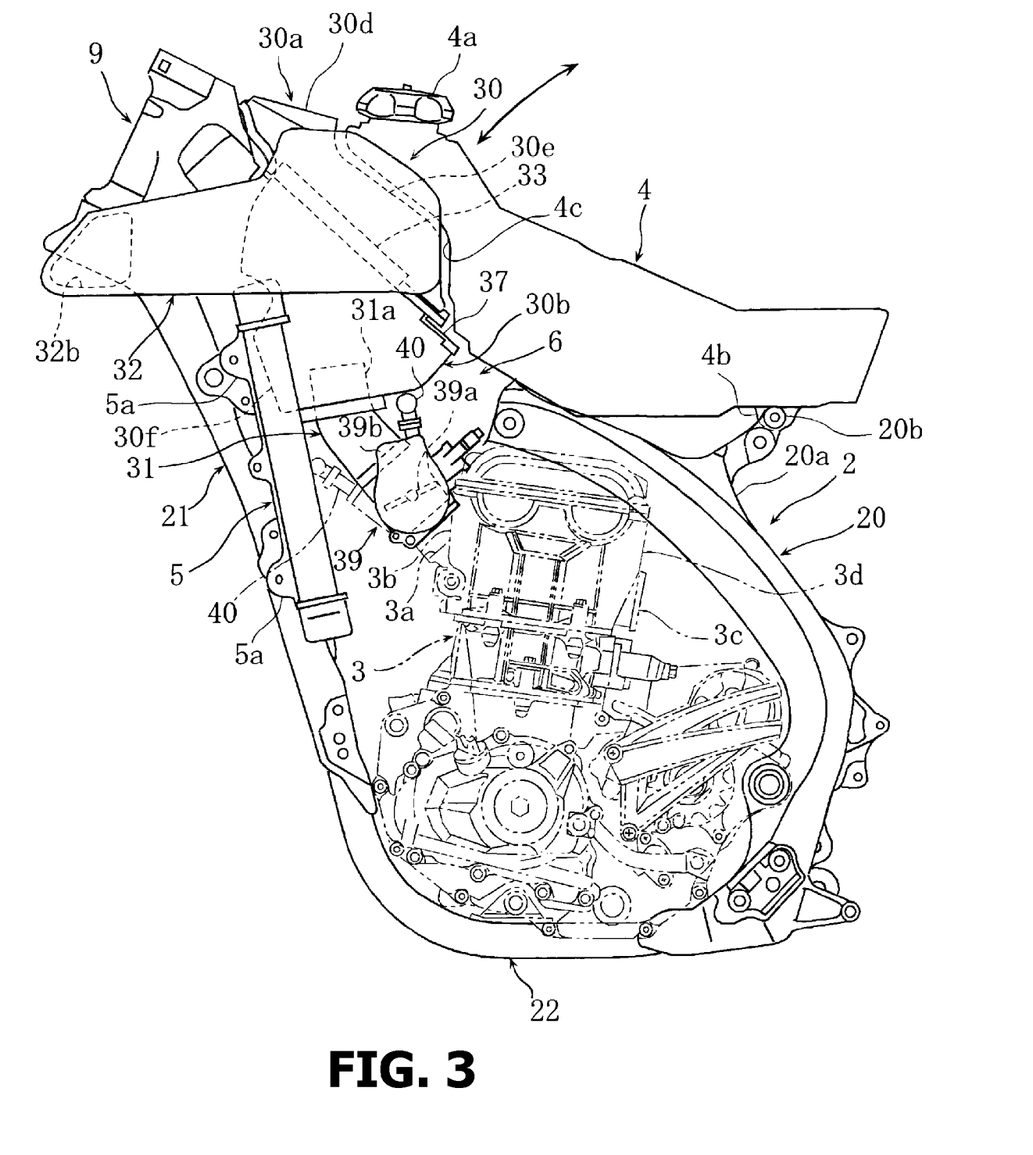
FIG. 3 is another side elevation view showing the intake device and there-around.

The bottom wall rear portion 4b of the fuel tank 4 is pivotally supported in an upwardly movable manner by hinge parts 20b formed at rear boss portions 20a of the right and left main frames 20 (see, FIG. 3). By pivotally moving the fuel tank 4 upward about the hinge parts 20b, the engine 3, the intake device 6, and so on, can be maintained from the vehicle upper side.

Figure 4:
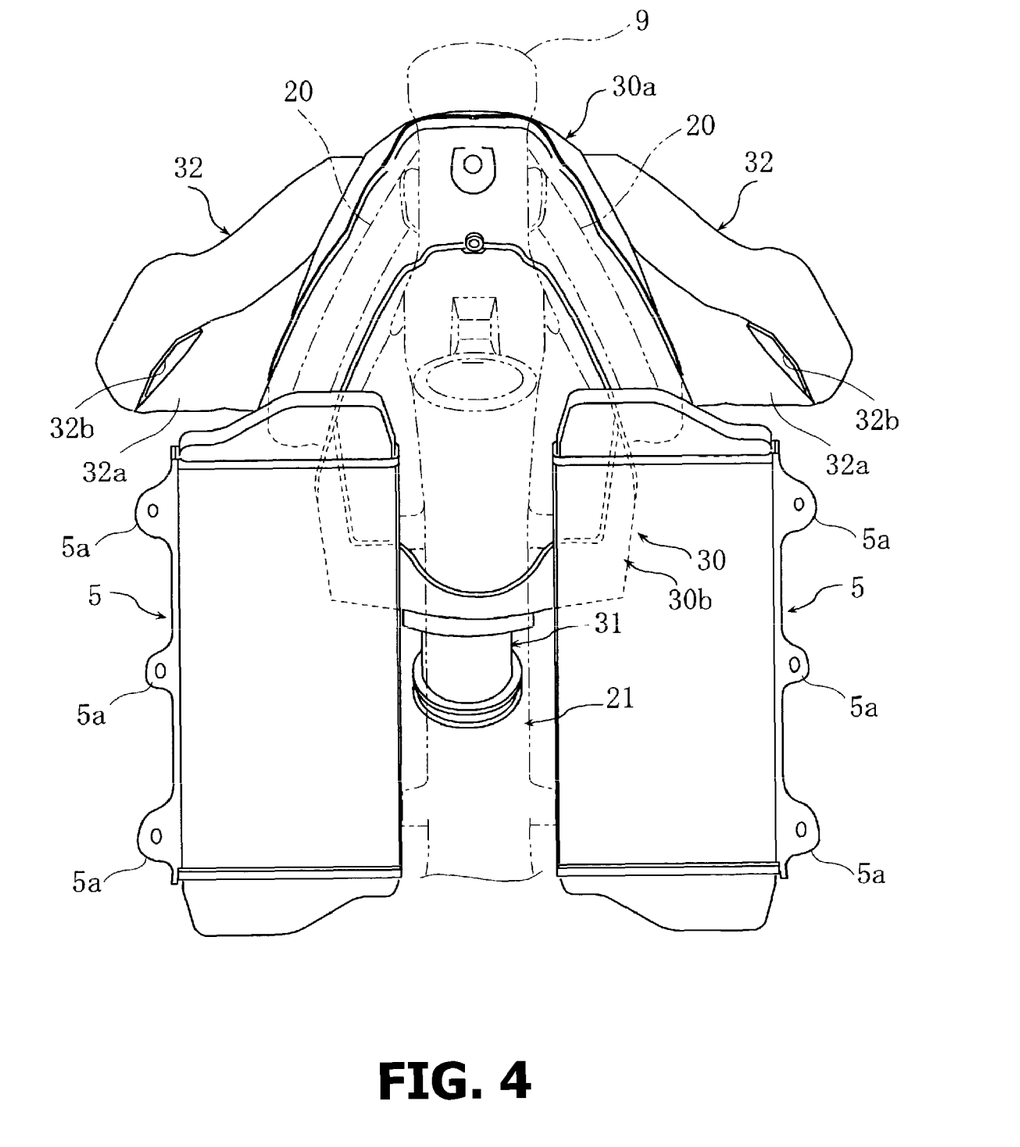
FIG. 4 is a front view of the intake device and there-around.

The first and second radiators 5 and 5 are disposed so as to extend in up-and-down directions at the outer side of the upper down tube 21 as viewed from the vehicle front side and attached to the upper down tube 21.

Figure 2:
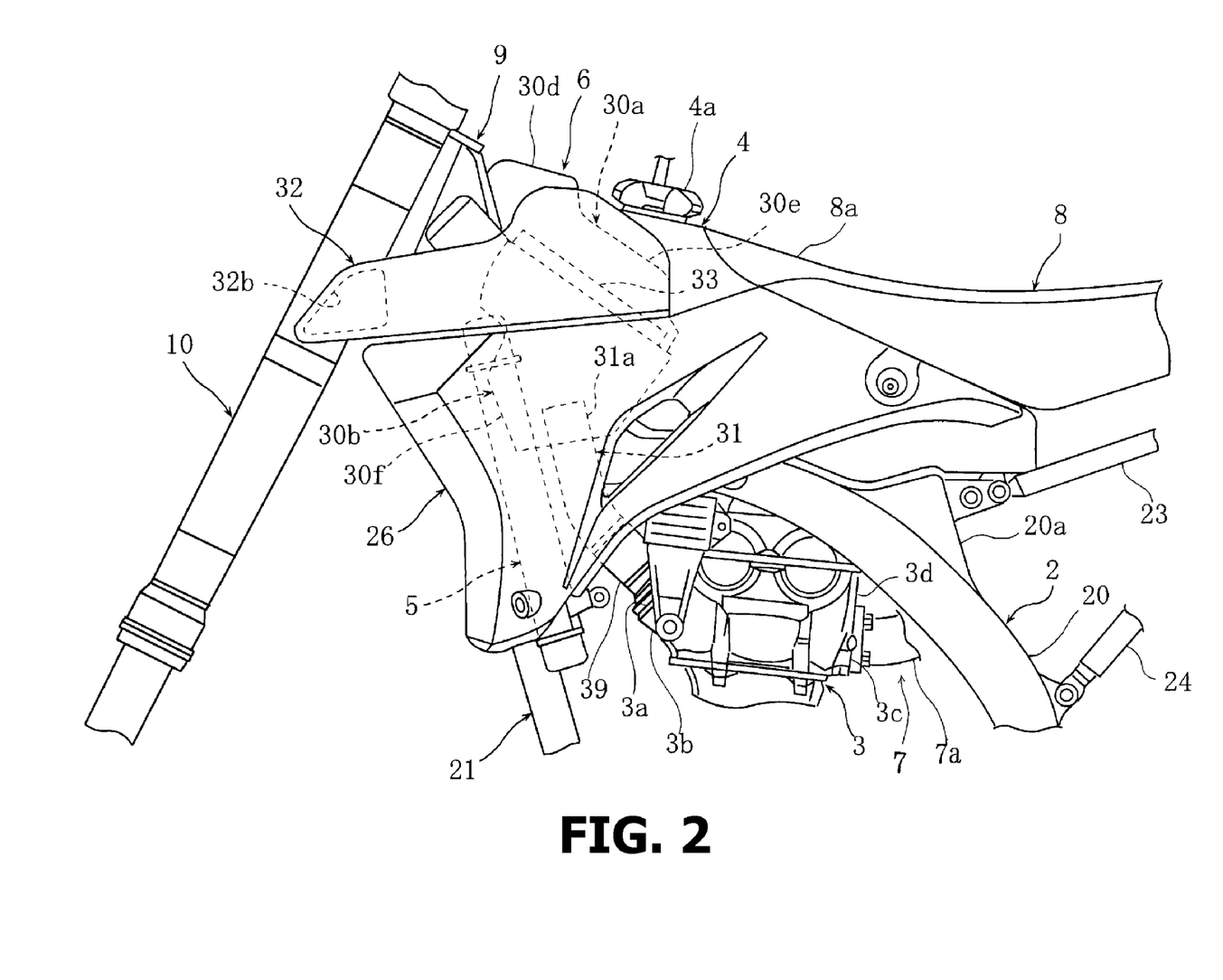
FIG. 2 is a side elevation view showing an intake device of the motorcycle and there-around.

The upper ends of the first and second radiators 5 and 5 are substantially positioned at the lower end of the head pipe 9, and the lower ends thereof are positioned at a position slightly lower than the lower edge of an intake port 3a of the engine 3 (see FIG. 2). The right and left side covers 26 are attached to the outer flange portions 5a of the first and second radiators 5 and 5 (see FIG. 4).

The intake device 6 of the motorcycle 1 in this embodiment adopts a front intake and rear exhaust system in which air is inhaled from the intake port 3a opened in the front wall 3b of the engine 3 and an exhaust gas is discharged from an exhaust port 3c opened in the rear wall 3d. Specifically, the intake device 6 has the following structure.

As shown in FIGS. 1 and 2, the exhaust device 7 has an exhaust pipe 7a connected to the rear wall 3d of the engine 3 and a muffler 7b connected to the downstream end of the exhaust pipe 7a. The exhaust pipe 7a communicates with the exhaust port 3c opened in the rear wall 3d of the engine 3.

The exhaust pipe 7a extends rearward at the right side of the rear cushion 16 from the rear wall 3d of the engine 3 and bent and formed into a substantially annular shape in a space formed by the rear cushion 16, the seat 8, and the rear wheel 15 (see, FIG. 1). By bending the exhaust pipe 7 as described above, the necessary length of the exhaust pipe 7a is secured while adopting a rear exhaust system.

The intake device 6 has an air cleaner (intake opening) 30 and an intake pipe (intake passage) 31 that connects the air cleaner 30 so as to be in fluid communication with the intake port 3a opened in the front wall 3b of the engine 3.

The intake port 3a of the engine 3 is formed so that the axis line thereof is directed obliquely forward and upward. The intake port 3a is connected with a throttle body 39 with a built-in throttle valve 39a. The intake pipe 31 is connected to the upstream opening of the throttle body 39. The intake pipe 31 is disposed so as to extend along the axis line of the intake port 3a substantially linearly. Meanwhile, a fuel injection valve 40 is attached to the rear wall of the throttle body 39 (see FIG. 3). The fuel injection valve 40 is disposed so as to inject and supply the fuel in the intake port 3a, more specifically, toward the rear surface of the intake valve. The reference numeral "39b" denotes a throttle opening degree sensor for detecting the opening degree of the throttle valve 39a.

The fuel injection valve 40 is located between the first and second radiators 5 and 5 as viewed from the vehicle front side, and, at the same time, disposed so as to be hidden behind the upper down tube 21.

The intake device 6 is provided with right and left air introduction ducts 32 and 32 connected to the air cleaner 30 and extending toward the vehicle front side. The right and left air introduction ducts 32 form an air introduction passage for introducing air into the air cleaner 30.

Figure 5:
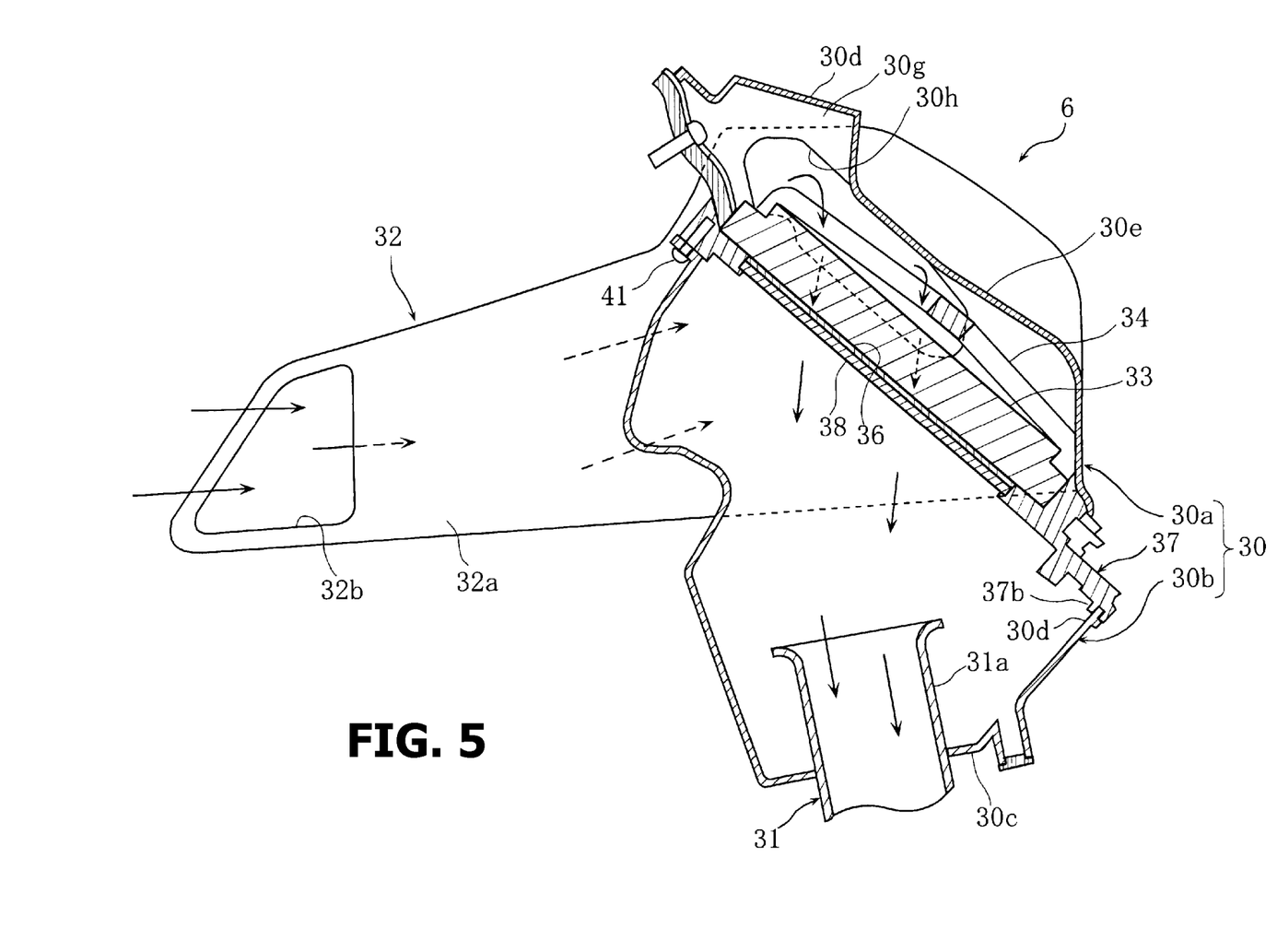
FIG. 5 is a cross-sectional side view of an air cleaner of the intake device.
Figure 6:
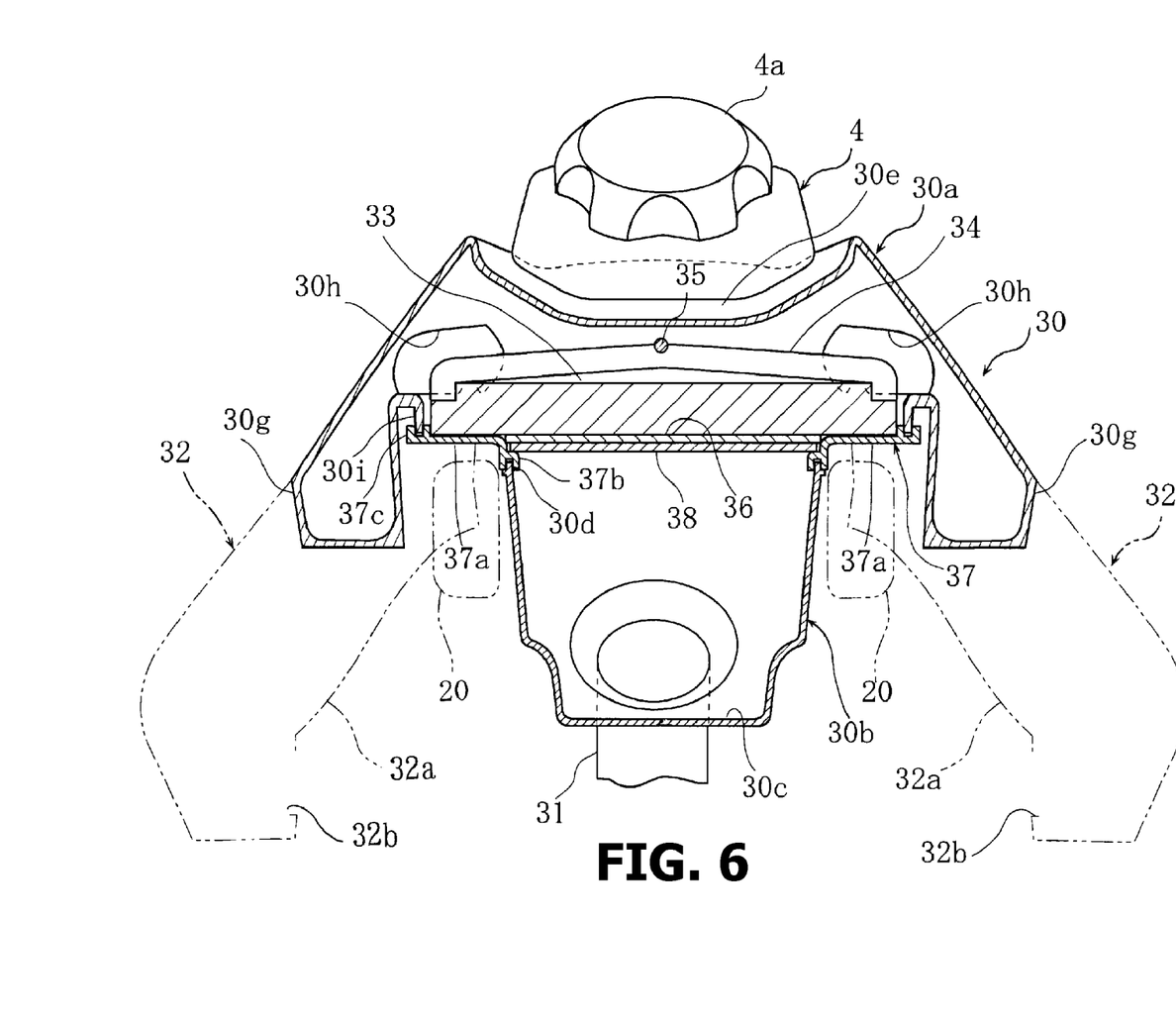
FIG. 6 is a cross-sectional front view of the air cleaner.
Figure 7:
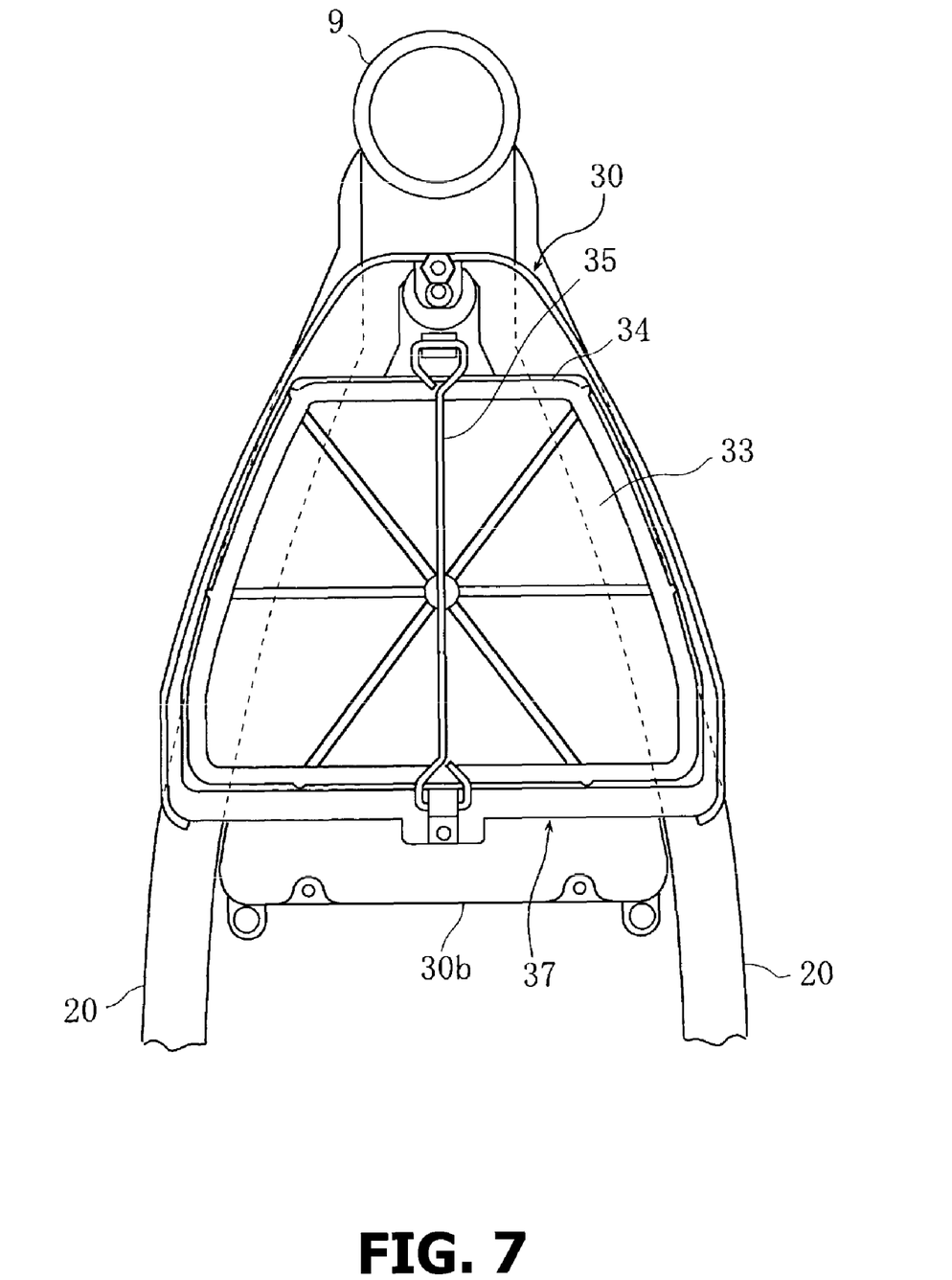
FIG. 7 is a plan view showing the air cleaner from which an upper case is removed.

As shown in FIGS. 5 and 6, the air cleaner 30 is divided into upper and lower cases, and has an upper case 30a located at the upper side and a lower case 30b located at the lower side, and an element 33 interposed at a boundary between the upper case 30a and the lower case 30b.

The lower case 30b is formed into a box-like shape with an opening 30d facing diagonally rearward and upward. The opening 30d of the lower case 30b is fitted to a lower side peripheral portion 37b of a frame body 37 formed substantially along the opening 30d of the lower case 30b, while the opening 30i of the upper case 30a is fitted to the upper side peripheral portion 37c of the frame body 37. The right and left side frame parts 37a and 37b of the frame body 37 are disposed so as to cover the main frames 20 from above (see FIG. 6). Further, the frame body 37 is fixed to the lower case 30b from the lower surface of the lower case 30b by a screw member 41.

The element 33 is disposed on the frame body 37. This element 33 is fixed to the frame body 37 with the pressing member 34 pressed by a fixed bar 35 so that the element 33 can be detached from the upper case 30a by removing the fixed bar 35. An auxiliary element 36 is disposed at the lower side of the element 33 so as to cover the opening of the frame body 37. The auxiliary element 36 prevents foreign matters, such as, e.g., dust, from entering into the lower case 30b during the exchange and/or maintenance of the element 33. A quenching net 38 for protecting each of the elements 33 and 36 from backfire is arranged in the opening of the frame body 37.

The lower case 30b is located between the right and left main frames 20 and 20, and extends downward lower than the lower edge of the main frame 20. The front wall portion 30f of the lower case 30b is located between the first and second radiators 5 and 5, and, at the same time, overlaps with the radiators 5 as viewed from the vehicle widthwise side (see FIG. 2).

The intake pipe 31 is connected to the bottom wall portion 30c of the lower case 30b. The upstream portion 31a of the intake pipe 31 protrudes into the lower case 30b.

The upper case 30a is removably attached to the frame body 37. In performing the replacement or maintenance of the element 33, the upper case 30a is removed with the fuel tank 4 pivoted upward.

The upper case 30a is disposed so as to be located between the fuel tank 4 and the head pipe 9 as viewed from the vehicle widthwise side, and extends in the vehicle widthwise direction so as to cover the right and left main frames 20 and 20 from above (see FIG. 6).

Specifically, the front half portion 30d of the upper case 30a is disposed so as to be exposed outside from between the fuel tank 4 and the head pipe 9, and the rear half portion 30e is disposed in a recess 4c formed in the front wall portion of the fuel tank 4 (see FIG. 3).

As shown in FIG. 6, the upper case 30a has right and left side wall portions 30g and 30g extending downward so as to cover the outside of the right and left main frames 20 and 20. The right and left side wall portions 30g have, on its upper portion, long hole-like air inflow openings 30h and 30h.

The right and left air introduction ducts 32 are attached to the upper case 30a, connected to the right and left side wall portions 30g of the upper case 30a, and communicate with the air inflow openings 30h. As shown in FIG. 5, each of the air introduction ducts 32 is formed so that the passage area of the rear side is larger than the passage area of the front side and that the front side of the air introduction duct 32 is positioned lower than the rear side thereof.

The right and left air introduction ducts 32 are disposed so as to pass around the vehicle widthwise outer sides of the first and second radiators 5 from the upper case 30a and extended near to the front end of the head pipe 9 positioned further forward than the radiator 5.

Furthermore, the right and left air introduction ducts 32 are disposed so that the vehicle widthwise distance thereof increases as it approaches from the rear side to the front side (see FIG. 4). This enables the right and left air ducts 32 to function as an air scoop which can effectively introduce flowing air into the engine 3 and the fuel tank 4.

Further, at the lower edges of the right and left air introduction ducts 32, the side covers 26 are disposed so as to form substantially continuous surfaces with the surfaces of the right and left air introduction ducts 32. As a result, the right and left air introduction ducts 32 also operate as a vehicle body cover.

The right and left air introduction ducts 32 each have a suction opening 32b located further forward than the radiator 5. The suction opening 32b is formed in the front end portion of the inner wall 32a located at the vehicle widthwise inner side of the air introduction duct 32 and opposed to the lower portions of the left and right side surfaces of the head pipe 9.

The flowing air from the vehicle front side is flown from the right and left suction openings 32b into the air introduction ducts 32 to be introduced from the right and left air inflow openings 30h into the upper case 30a. The air introduced into the upper case 30a is filtered by the element 33 to be flown in the lower case 30b, and introduced from the intake port 3a into a combustion chamber via the intake pipe 31 (see the arrows in FIG. 5).

The air cleaner 30 is disposed so as to be positioned between the fuel tank 4 and the radiators 5 as viewed from the vehicle widthwise side. More specifically, the air cleaner 30 is disposed in a space surrounded by the engine 3, the fuel tank 4, the radiators 5, and the head pipe 9.

The intake pipe 31 and the throttle body 39 are disposed so as to extend in the up-and-down directions between the fuel tank 4 and the radiators 5 as viewed from the vehicle widthwise side.

Furthermore, the intake pipe 31 and the throttle body 39 are located between the first and second radiators 5 as viewed from the front of the vehicle and disposed so as to be hidden behind the upper down tube 21 (see, FIG. 4).

According to this embodiment, the intake pipe 31 is disposed between the fuel tank 4 disposed above the engine 3 and the radiators 5 disposed in front of the engine 3, and therefore the intake pipe 31 can be disposed by using the narrow space between the fuel tank 4 and the radiators 5. This enables to realize the front intake engine configuration. In this case, the fuel tank 4 can be disposed at a lower position while securing the necessary capacity, which in turn can reduce the height of the seat 8. This enhances the rider's getting on-and-off performance and foot landing performance.

Furthermore, the intake pipe 31 is disposed so as to extend in the up-and-down directions, and therefore the intake pipe 31 and the intake port 3a of the engine are arranged substantially linearly. This can reduce the intake resistance, which in turn can contribute to the improvement of the engine performance.

Further, the air introduction ducts 32 extending substantially horizontally are connected to the upper case 30a of the air cleaner 30, and the intake pipe 31 extending in the substantially up-and-down directions is connected to the lower case 30b. Therefore, the flowing air is substantially horizontally flown in the air introduction ducts 32, changed the flow direction in such a state that the flow rate is reduced in the air cleaner 30 with a large capacity, and flown in the intake pipe 31 in the substantially up-and-down directions. As will be apparent from the above, in this embodiment, the changing angle in the flow direction is smaller than in a conventional rear intake system, and therefore, the resistance of the flow passage becomes small, thereby increasing the air introduction amount, which contributes to the improvement of the engine output.

In this embodiment, since the air cleaner 30 is disposed between the fuel tank 4 and the radiators 5, the air cleaner 30 can be disposed by using a narrow space between the fuel tank 4 and the radiators 5 while securing the necessary capacity of the air cleaner 30.

In this embodiment, since the right and left air introduction ducts 32 are extended forward, the suction openings 32b can be formed at a position forwardly away from the engine, which enables low temperature air free from undergoing a thermal influence from the engine to be supplied to the engine 3. As a result, the filling efficiency can be enhanced, which in turn can contribute to the improvement of the engine performance.

The suction opening 32b of the air introduction duct 32 is located further forward than the radiators 5, and therefore it is possible to prevent high temperature air, which has passed through the radiators 5, from being sucked through the suction opening 32b. This also enables supplying of low temperature air to the engine 3.

Furthermore, since the suction opening 32b is formed in the inner wall 32a of the air introduction duct 32, it cannot be seen from outside. This prevents deterioration of the appearance, and also prevents suction of foreign matters.

The right and left air introduction ducts 32 are disposed so as to surround the outside of the first and second radiators 5 and 5, and therefore the right and left air introduction ducts 32 can operate as an air scoop for introducing the flowing air into the engine 3 and the fuel tank 4, and also can operate as a vehicle body cover for improving the appearance.

In this embodiment, the upper case 30a of the air cleaner 30 is disposed so as to be located between the fuel tank 4 and the head pipe 9, and therefore the capacity of the upper case 30a can be increased by using the space between the fuel tank 4 and the head pipe 9.

Furthermore, the upper case 30a is disposed so as to extend in the vehicle widthwise direction to cover the right and left main frames 20 from above. Therefore, also from this view point, the capacity of the upper case 30a can be increased.

In this embodiment, the lower case 30b of the air cleaner 30 is located between the right and left main frames 20 and 20, and, at the same time, formed so as to extend lower than the lower edge of the main frame 20. Therefore, the necessary capacity of the lower case 30b can be easily secured.

The front wall portion 30f of the lower case 30b is located between the first and second radiators 5, and, at the same time, disposed so as to overlap the radiators 5 as seen from the vehicle widthwise direction. Therefore, the capacity of the lower case 30b can be further increased by using the space between the first and second radiators 5 and 5. Furthermore, the lower case 30b can be cooled by the flowing air passing through the space.

In this embodiment, the intake pipe 31 is disposed between the first and second radiators 5 and 5, and therefore the intake pipe 31 can be cooled by the flowing air passing through between the first and second radiators 5 and 5.

In this embodiment, the fuel injection valve 40 is provided at the throttle body 39 connected to the intake pipe 31, which enables cooling of the fuel injection valve 40 by the flowing air passing through between the first and second radiators 5.

Furthermore, the fuel injection valve 40 is disposed so as to be located behind the upper down tube 21, which prevents possible damage due to, e.g., flying stones from the front side of the vehicle and/or adhesion of muddy water, etc.

In this embodiment, although the fuel injection valve 40 is disposed on the rear wall of the throttle body 39, the fuel injection valve of the present invention can be disposed on the front wall of the throttle body 39 as shown by the chain double-dashed line in FIG. 3.

Also in that case, functions and effects similar to those in the aforementioned embodiment can be obtained.

In this application, the language "motorcycle" is to be construed broadly and encompasses various motorized vehicles that are ridden by one or more rider, including, e.g., motorbikes (e.g., road bikes, dirt bikes, etc.), scooters, mopeds and other similar vehicles, which can include two wheeled vehicles and vehicles having more than two wheels (such as, e.g., trikes, all terrain vehicles (ATVs), etc.).

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A motorcycle, comprising:
a vehicle body frame;
an engine mounted on the vehicle body frame, the engine being a single cylinder engine including a single cylinder having a cylinder axis inclined rearwardly;
a fuel tank disposed above the engine;
a radiator disposed in front of the engine; and
an intake device connected to the engine,
wherein the intake device includes an intake opening and an intake passage that connects the intake opening to be in fluid communication with a front portion of the engine, and
wherein the intake passage is disposed between the fuel tank and the radiator as viewed from a side of the motorcycle.

2. The motorcycle as recited in claim 1, further comprising a seat, wherein a front portion of the seat is disposed above the fuel tank.

3. The motorcycle as recited in claim 1,
wherein the intake opening includes an air cleaner, and
wherein the air cleaner is disposed so that at least a part thereof is located directly behind the radiator as viewed from a side of the motorcycle.

4. The motorcycle as recited in claim 3,
wherein the intake device further comprises an air introduction passage connected to the air cleaner and extending toward a front side of the motorcycle.

5. The motorcycle as recited in claim 4,
wherein the air cleaner has an upper case disposed on an upper side, a lower case disposed on a lower side, and an element interposed between the upper case and the lower case, and
wherein the air introduction passage is connected to the upper case, and the intake passage is connected to the lower case.

6. The motorcycle as recited in claim 4,
wherein the air introduction passage has a suction port located further forward than the radiator.

7. The motorcycle as recited in claim 6,
wherein the suction port is disposed at a vehicle widthwise inner side of the air introduction passage.

8. The motorcycle as recited in claim 4,
wherein the air introduction passage is disposed so as to pass around a vehicle widthwise outer side of the radiator.

9. The motorcycle as recited in claim 4,
wherein the intake passage extends in up-and-down directions.

10. The motorcycle as recited in claim 1,
wherein the vehicle body frame has a head pipe located in front of the fuel tank,
wherein the intake opening includes an air cleaner, and
wherein the air cleaner is disposed so that at least a part thereof is located between the fuel tank and the head pipe as viewed from a side of the motorcycle.

11. The motorcycle as recited in claim 10,
wherein the vehicle body frame has right and left main frames extending rearward of a vehicle from the head pipe,
wherein the air cleaner has an upper case disposed on an upper side, a lower case disposed on a lower side, and an element interposed between the upper case and the lower case, and
wherein the upper case bulges out in the vehicle widthwise direction so as to cover the right and left main frames from above.

12. The motorcycle as recited in claim 11,
wherein the lower case is located between the right and left main frames and a portion of the lower case extends further downward than at least one lower edge of the left and right main frames.

13. The motorcycle as recited in claim 1,
wherein the radiator includes a first radiator and a second radiator disposed on one vehicle widthwise side and the other vehicle widthwise side, respectively,
wherein the intake opening includes an air cleaner, and
wherein a part of the air cleaner is located between the first and second radiators as viewed from a front side of the motorcycle and disposed so as to overlap with the radiators as viewed from a vehicle widthwise side of the motorcycle.

14. The motorcycle as recited in claim 13,
wherein the intake passage is disposed so as to be located between the first and second radiators as viewed from a front side of the motorcycle.

15. The motorcycle as recited in claim 14,
wherein a throttle body is connected to the intake passage, and
wherein the throttle body includes a fuel injection valve for injecting and supplying fuel into an intake port of the engine.

16. The motorcycle as recited in claim 1,
wherein a throttle body is connected to the intake passage,
wherein the throttle body includes a fuel injection valve for injecting and supplying fuel into an intake port of the engine, and
wherein the fuel injection valve is located between the intake passage and the radiator as viewed from a vehicle widthwise side of the motorcycle.

17. An intake device configured to be mounted on a motorcycle that includes a vehicle body frame, an engine mounted on the vehicle body frame, a fuel tank disposed above the engine, and a radiator disposed in front of the engine, the intake device being configured to be connected to the engine, the intake device comprising:
an intake opening; and
an intake passage which connects the intake opening in fluid communication with a front portion of the engine,
wherein the intake passage is configured to be disposed directly behind the radiator as viewed from a side of the motorcycle; and
the engine is a single cylinder engine including a single cylinder having a cylinder axis inclined rearwardly.

18. The intake device as recited in claim 17,
wherein the intake opening includes an air cleaner, and
wherein the air cleaner is disposed so that at least a part thereof is located between the fuel tank and the radiator as viewed from a side of the motorcycle.

19. The intake device as recited in claim 18, further comprising an air introduction passage connected to the air cleaner and extending toward a front side of the motorcycle.

20. The motorcycle as recited in claim 1, further comprising a front fender arranged to cover a front wheel, wherein the radiator is arranged directly behind at least a portion of the front fender as viewed from a side of the motorcycle.

21. A motorcycle, comprising:
a vehicle body frame;
an engine mounted on the vehicle body frame;
a fuel tank disposed above the engine;
a radiator disposed in front of the engine; and
an intake device connected to the engine,
wherein the intake device includes an intake opening, and an intake passage that connects the intake opening to be in fluid communication with a front portion of the engine,
wherein the intake passage is disposed between the fuel tank and the radiator as viewed from a side of the motorcycle,
wherein the radiator includes a first radiator and a second radiator disposed on one vehicle widthwise side and the other vehicle widthwise side, respectively,
wherein the intake opening includes an air cleaner, and
wherein a part of the air cleaner is located between the first and second radiators as viewed from a front side of the motorcycle and disposed so as to overlap with the radiators as viewed from a vehicle widthwise side of the motorcycle.

22. The motorcycle as recited in claim 21,
wherein the intake passage is disposed so as to be located between the first and second radiators as viewed from a front side of the motorcycle.

23. The motorcycle as recited in claim 22,
wherein a throttle body is connected to the intake passage, and wherein the throttle body includes a fuel injection valve for injecting and supplying fuel into an intake port of the engine.

* * * * *